UNITED STATES PATENT OFFICE.

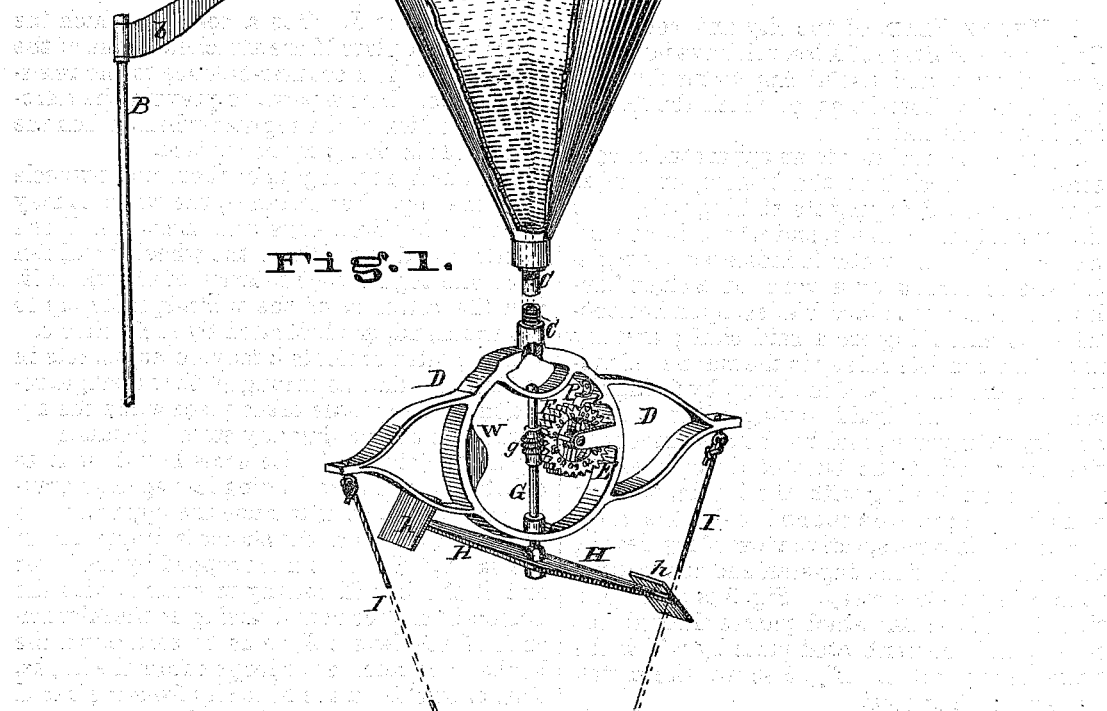
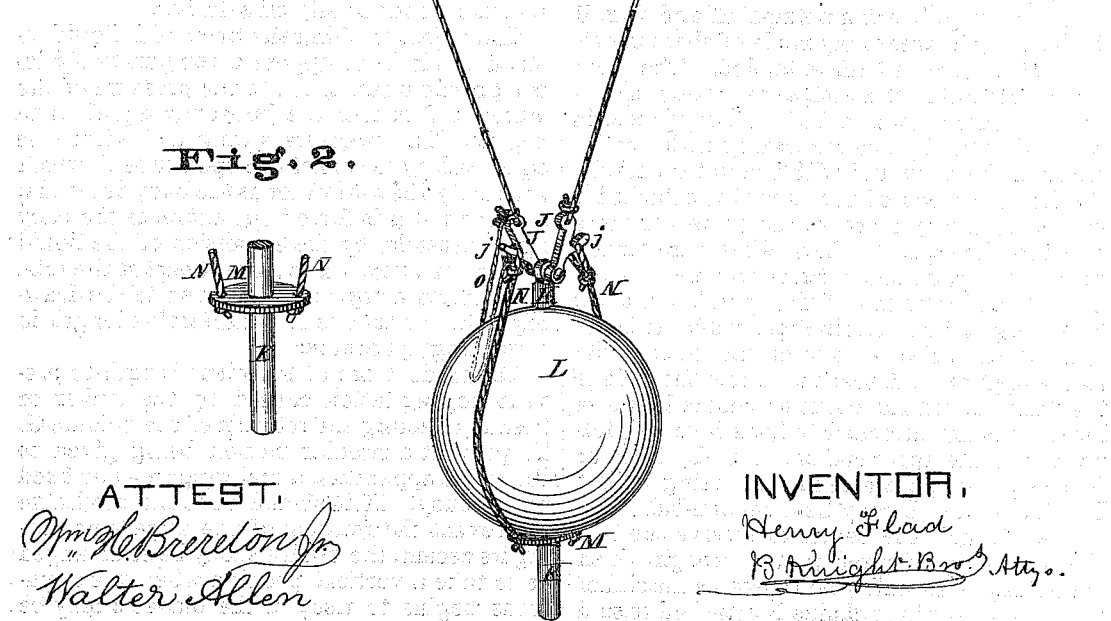

HENRY FLAD, OF ST. LOUIS, MISSOURI.

IMPROVEMENT IN DEEP-SEA-SOUNDING APPARATUS.

Specification forming part of Letters Patent No. 126,795, dated May 14, 1872.

I, HENRY FLAD, of the city and county of St. Louis, and State of Missouri, have invented a certain new and useful Apparatus for Taking Deep-Sea Soundings, of which the following is a specification:

My invention relates to an apparatus so constructed as to sink to the bottom, and, after automatically dropping its sinking-weight, to rise again to the surface, and whose downward movement in the water is indicated by register-wheels turned by a worm on a shaft having rotation, by inclined blades, upon horizontal arms extending from said shaft; and my invention consists chiefly in the manner of preventing the collapse of the buoy, by filling the same with some liquid having a less specific gravity than water, and by the attachment to the lower end of the buoy of an open-ended tube communicating with the inside, so as to equalize the pressure out and inside the buoy.

Figure 1 is a perspective view of my device, the chief parts of the flag-staff and connecting-tube being broken away. Fig. 2 is a perspective view of the bar which passes through the sinker, and the perforated plate by which the sinker is supported. Fig. 3 shows the metallic flag and flag-staff.

A is a buoy, bearing a flag-staff and flag, B b. The flag is preferably made of sheet metal, so as to always remain extended. The buoy is also preferably of metal, so as to resist moisture. From the lower end of the buoy proceeds an open tube, C, communicating with the interior of the buoy and with the water outside. To the lower end of the tube C is attached a frame, D, in which are journaled two or more register-wheels, E F. These wheels are turned by a worm, $g$, on the vertical spindle or shaft G. At the lower end of the spindle are arms H, having at their ends inclined blades or floats $h$, on which the water acts to turn the spindle as the apparatus descends. From the ends of the frame D extend cords or chains I, whose lower ends are attached to hook-levers J, fulcrumed to the upper end of a bar, K. The bar K passes through a hole in the sinking-weight L. The sinker L may be a cannon-ball, with a hole through the center to receive the bar. M is a small perforated plate, through which the bar K passes, and which sustains the sinker by means of cords or chains N attached to said plate, and having loops $n$ engaged on the hooks $j$ of the levers J. O is a cord, by which the cords N and plate M are attached to one of the cords, I. W is a counter-balance to the register-wheels. P is a pawl, to prevent the retrograde rotation of the register-wheels when the apparatus is rising to the surface.

The numbers of cogs upon the register-wheels vary one cog. For instance, the wheel E may have one hundred cogs and the wheel F one hundred and one. Then the wheel F will fall back one cog for each rotation of the wheel E, and the rotations of the worm-spindle, up to ten thousand, are indicated by such wheels.

The plates or floats $h$ may be adjustable in inclination, and so arranged that a single rotation of the spindle takes place while the apparatus is descending any stated distance.

The buoy is filled with some liquid, such as spirits of turpentine, having less specific gravity than water, so as to raise the apparatus up to the surface when the sinker is dropped from the bar K. The sinker is dropped by the lower end of the bar K coming in contact with the bottom of the ocean and raising up the fulcrum-ends of the levers J, so as to turn down the hooks $j$ and release the loops $n$ from the hooks. This allows the plate M to slip from the bar K and the sinker to slip off said bar.

The object of filling the buoy with liquid instead of air is to oppose a comparatively incompressible substance to the pressure of the water, and render the buoyancy equal at all depths. The pressure within and without is equalized by means of the open tube C, which gradually fills with water as the buoy descends; and the water is forced out again, as the buoy again ascends, by the expansion of the liquid within the buoy. The greater part of the tube C is broken away, and not shown in the drawing; but the tube is of considerable length in a working apparatus.

The cords I are of sufficient length to prevent any agitation caused by the sinker or "lead" affecting the rotation of the spindle G. To prevent a circular motion being given to the whole apparatus, radial wings may be fixed to the buoy. If it should be found advisable to prevent the rotation of the apparatus during its ascent, the blades $h$ may be so arranged as to take a vertical position when the apparatus begins to rise; or the blades $h$ may be attached to a loose collar on the shaft G, turning freely when the apparatus is rising, but turning the shaft, by means of a pawl, when descending.

Deep-sea soundings made by means of a sounding line or wire have proved unreliable, chiefly for the following reasons: First, the line continues to run out after the lead has reached the bottom, either owing to the momentum of such a great length of line, or from the under currents carrying the line horizontally. Second, in case a wire is used, the mere weight of the wire may far exceed that of the lead, and render it impossible to detect the striking of the latter against the bottom. Third, the friction of the line in the water is so great that the time of the lead reaching the bottom cannot be determined, and the line, unless of considerable strength, is broken at the lower end in dragging the line through the water, (see Prof. Maury's Physical Geography, chap. 11, page 200: N. Y., 1855.)

My apparatus operates entirely irrespective of the horizontal currents, as its vertical movement downward through the water is alone indicated, its horizontal movement with the water obviously having no effect on the register.

Some of the advantages of this apparatus may be stated as follows: First, vertical movement is alone indicated. Second, saving of time, as when a long line is used its friction in the water causes it to run out slowly. Third, the saving of the cost of the line, which is not recovered in the deepest soundings, its hold in the water and the weight of the lead rendering its drawing up impracticable. Fourth, certainty, as there is no line to be accidentally broken by under currents, fish, &c. Fifth, capacity to preserve its buoyancy and resist hydrostatic pressure at great depths.

I do not claim the sinker-releasing device, as the same was invented by Lieut. Brooke, of the United States Navy, and known as Brooke's Deep-Sea-Sounding Apparatus, (but used at the end of a sounding-line;) nor do I claim the mode of measuring and recording the depth to which the apparatus has traveled, this being performed by an instrument in all respects similar to an apparatus invented by Mr. Woltman, and used for determining the velocity of current in rivers; but

I claim as my invention—

The buoy A, containing liquid of less specific gravity than water, and whose interior has communication, by a tube, C, with the water, substantially as and for the purpose set forth.

Witness my hand.

HENRY FLAD.

Witnesses:
   SAML. KNIGHT,
   ALBERT DWELLE.